Aug. 11, 1970  SHINICHIRO OGAWA ET AL  3,524,122

ELECTRIC CURRENT OPERATIONAL DEVICE

Filed Sept. 23, 1968

INVENTORS.
SHINICHIRO OGAWA
BY TOSHIYUKI MATSUDA

ATTORNEY

United States Patent Office

3,524,122
Patented Aug. 11, 1970

3,524,122
ELECTRIC CURRENT OPERATIONAL DEVICE
Shinichiro Ogawa and Toshiyuki Matsuda, Tokyo, Japan, assignors to Honeywell Inc., Minneapolis, Minn., a corporation of Delaware
Filed Sept. 23, 1968, Ser. No. 761,622
Claims priority, application Japan, Sept. 22, 1967, 42/60,556
Int. Cl. H02j 7/00; H02m 7/00
U.S. Cl. 321—15     1 Claim

ABSTRACT OF THE DISCLOSURE

A first circuit comprises two direct current sources, a changeover switch, a differential electric charge detecting capacitor, a filter, a voltage-current converter and a current comparator. A second circuit comprises a direct current source, a changeover switch, a differential electric charge detecting capacitor, a filter and a voltage-current converter. By changing the changeover switches stated above over synchronously an operation is performed between the currents of the direct current sources stated above.

BACKGROUND OF THE INVENTION

This invention relates to an electric current operational device and more particularly to an electric current operational device comprising a first circuit and a second circuit, in each of them during a changeover switch is in a position a capacitor is charged from an electrical source and during the changeover switch is in the other position the capacitor is charged from another electrical source. The circuit making the second charge constitutes a negative feedback circuit to the circuit making the first charge. The changeover switches in the two circuits are synchronously changed over to perform an operation.

SUMMARY OF THE INVENTION

In the invention of subject application, the device consists of a first circuit consisting of two direct current sources, a changeover switch, a differential electric charge detecting capacitor, a filter, a voltage-current converter and a current comparator, and a second circuit consisting of a direct current source, a changeover switch, a differential electric charge detecting capacitor, a filter and a voltage-current converter; said changeover switches being synchronously changed over to perform an operation between the currents of the above-mentioned various direct current sources.

The object of this invention is to obtain an operational device of high accuracy by means of an extremely simple circuit composition which requires only a small number of components and no special types of components.

Further, as the device of this invention employs a circuit composition which uses a negative feedback circuit, it is possible to ignore the effects given to the conversion accuracy by the characteristic variations of the various components brought about by the changes of the ambient temperature and humidity, and the performance of the device becomes stable. Such a device can be used in the field of industrial measurement as, for instance, an element composing the operational unit for electric current signals.

DESCRIPTION OF THE PREFERRED EMBODIMENTS

Figure 1:
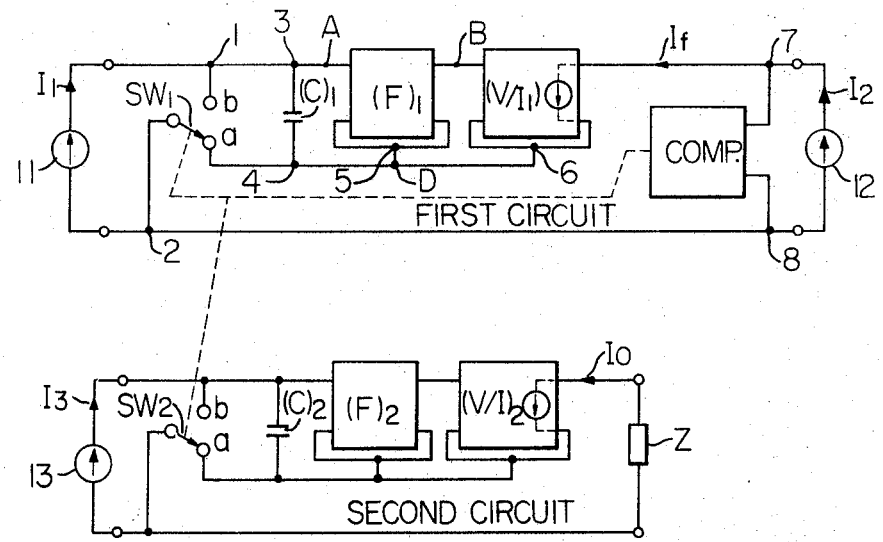
FIG. 1 is a circuit connection diagram showing the basic composition of the electric current operational device of this invention.

In the first circuit shown in FIG. 1, the positive terminal of a constant current source 11 which generates a direct current $I_1$ of, for instance, from 4 ma. to 20 ma. is connected to a fixed contact $b$ of a switch $SW_1$ and a negative terminal 2 is connected to the movable contact of the switch $SW_1$ and a negative terminal 8 of another constant current source 12.

The switch $SW_1$, repeated switching over, has a fixed contact $a$ beside the above fixed contact $b$ and its movable contact is switched repeatedly to the two fixed contacts alternately according to a time ratio $Ta/Tb$ given by a current comparator COMP, where $Ta$ and $Tb$ represent the time during which the movable contact of the switch $SW_1$ is in contact with the fixed contacts $a$ and $b$, respectively. A differential electric charge detecting capacitor $(C)_1$ is connected between the two fixed contacts.

The terminal voltage of the capacitor $(C)_1$ is applied across the input terminals of a low-pass filter $(F)_1$ having a high input impedance and the filter generates an averaged DC voltage across its output terminals. A voltage-current converter $(V/I)_1$ has its input terminals connected to the output terminals of the filter $(F)_1$ and generates between its output terminals a direct current $I_f$ of an amplitude proportionate to the output DC voltage of the filter $(F)_1$.

In other words, as it is possible to consider this converter as a kind of constant current source, it is indicated by the symbol ⊕ as a constant current source in the first circuit of FIG. 1. As a result, the diagram gives an impression as if a constant current source is connected to the output terminals, but this does not imply that the voltage-current converter $(V/I)_1$ contains a constant current source.

Negative terminal 8 of constant current source 12 is connected, as stated above, to the movable contact of the switch $SW_1$ through negative terminal 2 and the other terminal 7 of it is connected to a terminal of the voltage-current converter $(V/I)_1$. Consequently, while the movable contact of the switch $SW_1$ is in contact with the fixed contact $a$, constant current source 12 is directly connected between the output terminals of the voltage-current converter $(V/I)_1$, and while the movable contact of the switch $SW_1$ is in contact with the fixed contact $b$, constant current source 12 is connected between the output terminals of the voltage-current converter $(V/I)_1$ through the capacitor $(C)_1$.

The current comparator COMP is connected between terminals 7 and 8 to control the change time of the changeover switch $SW_1$ and a changeover switch $SW_2$ which will be described later.

Further, in the second circuit of FIG. 1, the positive terminal of a constant current source 13 which generates direct current $I_3$ of, for instance, from 4 ma. to 20 ma. is connected to a fixed contact $b$ of the switch $SW_2$ and the negative terminal is connected to the movable contact of the switch $SW_2$ and a terminal of a load Z.

The switch $SW_2$ has a fixed contact $a$ beside the above fixed contact $b$ and its movable contact is switched to the two fixed contacts alternately according to the given time ratio $Ta/Tb$, where $Ta$ and $Tb$ represent the time during which the movable contact of the switch $SW_2$ is in contact with the fixed contacts $a$ and $b$, respectively. As the two switches are changed synchronously, the two time ratios take the same value. A differential electric charge detecting capacitor $(C)_2$ is connected between the two fixed contacts.

The terminal voltage of the capacitor $(C)_1$ is applied across the input terminals of the low-pass filter $(F)_2$ having a high input impedance and the filter generates an averaged DC voltage across its output terminals. A voltage-current converter $(V/I)_2$ has its input terminals connected to the output terminals of the filter $(F)_2$ and generates between its output terminals a direct current $I_0$ of an amplitude proportionate to the output DC voltage of the filter $(F)_2$.

Figure 2:
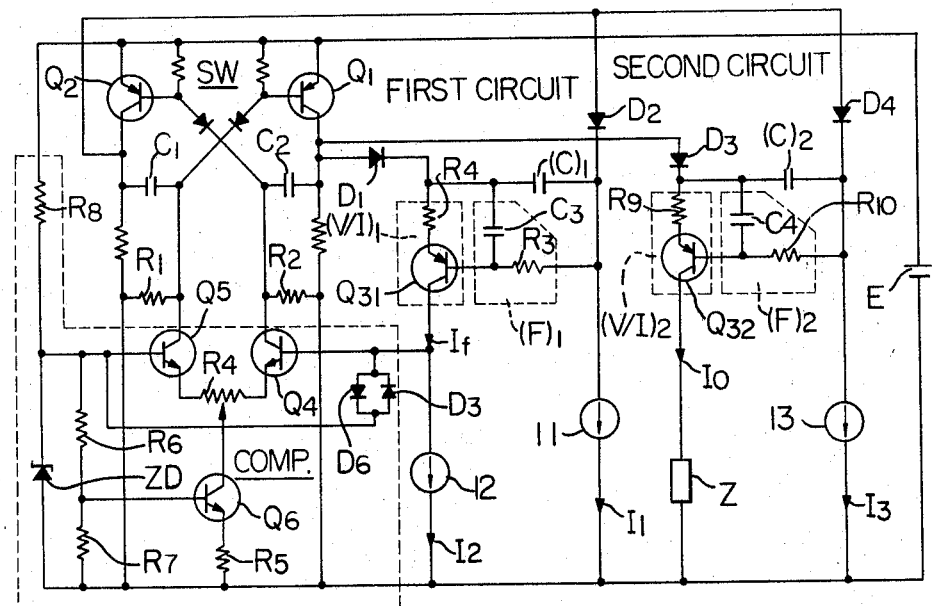
FIG. 2 is a circuit connection diagram showing an embodiment of the electric current operational device of this invention.

In other words, as it is possible to consider this converter as a kind of constant current source, it is indicated by the symbol as a constant current source in the second circuit of FIG. 2. As a result, the diagram gives an impression as if a constant current source is connected to the output terminals, but this does not imply that the voltage-current converter $(V/I)_2$ contains a constant current source.

As stated above, a terminal of the load Z is connected to the movable contact of the switch $SW_2$ and the other terminal is connected to a terminal of the voltage-current converter $(V/I)_2$. Consequently, while the movable contact of the switch $SW_2$ is in contact with the fixed contact $b$, the load Z is directly connected between the output terminals of the voltage-current converter $(V/I)_2$, and while the movable contact of the switch $SW_2$ is in contact with the fixed contact $a$, the load Z is connected between the output terminals of the voltage-current converter $(V/I)_2$ through the capacitor $(C)_2$.

The electric current operational device of this invention is composed of the first circuit and the second circuit explained above and the changeover switches $SW_1$ and $SW_2$ of the two circuits perform synchronous switching operations.

In FIG. 2, the switch SW consists of an astable multivibrator containing transistors $Q_1$ and $Q_2$, capacitors $C_1$ and $C_2$, and resistors $R_1$ and $R_2$; and at this time the switch SW is used in common for the switches $SW_1$ and $SW_2$. Diodes $D_1$, $D_2$ and $D_3$, $D_4$ are connected between the switch SW and the differential electric charge detecting capacitors $(C)_1$ and $(C)_2$, respectively and perform the function to prevent the reverse flow.

Transistors $Q_{31}$ and $Q_{32}$ and resistors $R_4$ and $R_9$ connected to their emitters respectively form the current-voltage converters $(V/I)_1$ and $(V/I)_2$. Capacitors $C_3$ and $C_4$, and resistors $R_3$ and $R_{10}$ respectively form filters $F_1$ and $F_2$.

Further, in FIG. 2, a variable resistor $R_4'$, resistors $R_5$ through $R_8$, transistors $Q_4$ through $Q_6$, diodes $D_5$ and $D_6$, and a Zener diode ZD constitute the current comparator COMP comprising a high gain current driven differential amplifier as shown in the figure, the current output thereof controlling the changeover times $Ta$ and $Tb$ of the changeover switches referred to above. The operation of the first circuit of FIG. 1 is as explained below.

When the switch $SW_1$ changes to the side of the fixed contact $a$, the direct current $I_1$ from constant current source 11 flows into the capacitor $(C)_1$ for time $Ta$ and the charge $I_1 Ta$ is accumulated in it.

Next, when the switch $SW_1$ changes to the side of the fixed contact $b$, the direct current $I_f$ as the output of the voltage-current converter $(V/I)_1$ flows into the capacitor $(C)_1$ for time $Tb$ in the direction opposite to the direct current $I_1$, and the charge $I_f Tb$ is accumulated in it.

Accordingly, during the time $Ta+Tb$ is accumulated the differential charge $\Delta Q = I_1 Ta - I_f Ta$ in the capacitor $(C)_1$.

Now, when $\Delta Q > 0$, the mean DC voltage of the capacitor $C_1$ increases with a resultant increase of the output current $I_f$ of the voltage-current converter $(V/I)_1$, whereas when $\Delta Q < 0$, the mean DC voltage of the capacitor $C_1$ decreases with a resultant decrease of the output current $I_f$ of the voltage-current converter $(V/I)_1$. In either case, the device functions so that $\Delta Q = 0$.

It the equilibrium state where $\Delta Q = 0$ is maintained, the output current $I_f$ can be expressed as follows.

$$I_f = \frac{Ta}{Tb} I_1$$

The above equation shows that in the first circuit, the components other than the current comparator COMP and second constant current source 12 perform the function to multiply the current $I_1$ by the time ratio.

Next, the current comparator COMP receives as its input the differential current between the current $I_2$ of second constant current source 12 and the output current $I_f$ of the voltage-current converter $(V/I)_1$, and controls the changeover switch $SW_1$ so as to make the differential current zero. That is to say, the current comparator COMP functions to make the output current $I_f$ equal to the current $I_2$ by increasing $Ta/Tb$ when $I_2 - I_f > 0$, and by decreasing $Ta/Tb$ when $I_2 - I_f < 0$. As the result, the following relation can be obtained in the state of equilibrium.

$$I_f = I_2$$

Therefore, the current ratio can be obtained as below.

$$\frac{I_2}{I_1} = \frac{T_a}{T_b}$$

This equation shows that in the first circuit the two given currents $I_1$ and $I_2$ can be converted according to the time ratio.

Next, in the second circuit, as the changeover switch $SW_2$ is changed over synchronously with the changeover switch $SW_1$ of the first circuit, the following relation can be established in the equilibrium state between the output current $I_0$ of the voltage-current converter $(V/I)_2$ and the current $I_3$ of constant current source 13.

$$I_0 = \frac{Ta}{Tb} I_3$$

If we substitute the time ratio $Ta/Tb$ in the above equation, we can obtain the following relation among the currents $I_0$, $I_1$, $I_2$ and $I_3$.

$$I_0 = \frac{I_2 \cdot I_3}{I_1}$$

Thus, it is made clear that operations of multiplication and division can be conducted among the current $I_0$ supplied to the load Z and the currents $I_1$, $I_2$ and $I_3$ of respective direct current sources 11, 12 and 13.

For example, if current $I_2$ is selected so that it becomes equal to current $I_3$, we obtain the following relation.

$$I_0 = \frac{I_3^2}{I_1}$$

Now, if the current $I_1$ is set at a predetermined constant value, we can perform square operations with current $I_2$ as the variable.

In the above application example, if a plurality of the second circuits are used, it is possible to perform a plurality of operations at the same time.

We claim:
1. An electric current operational device composed of a first circuit and a second circuit,
   said first circuit comprising;
   a first differential electric charge detecting capacitor;
   a first changeover switch having one and the other fixed contacts connected respectively to the two electrodes of said first capacitor and having a movable contact which can be switched so as to contact said one and said the other fixed contacts for time $Ta$ and $Tb$, respectively;
   a current comparator controlling said first changeover switch;
   a first current source connected to said first capacitor to charge in one direction with a current I, thereof only while the movable contact of said first changeover switch contacts with the one of said fixed contacts;

first means averaging a voltage across said electrodes corresponding to the charges accumulated in said first capacitor to obtain a first DC voltage;

a first voltage-current converter converting said first DC voltage into a first output direct current having a magnitude proportional to said first DC voltage and forming a first negative feedback circuit by being connected to said first capacitor through said first current comparator only while the movable contact of said first changeover switch contacts with the other one of said fixed contacts; and a second current source connected to said first current comparator so that a current $I_2$ thereof can be compared with the output current of said first voltage-current converter;

said second circuit comprising;

a second differential electric charge detecting capacitor;

a second changeover switch having one and the other fixed contacts connected respectively to the two electrodes of said second capacitor and having a movable contact which can be switched to said fixed contacts over synchronously with the changeover switch of said first circuit;

a third current source connected to said second capacitor to charge in one direction with a current $I_3$ thereof only while the movable contact of said second changeover switch contacts with the one of said fixed contacts;

second means averaging a voltage across said electrodes corresponding to the charges accumulated in said second capacitor to obtain a second DC voltage; and a second voltage-current converter converting said second DC voltage into a second output direct current having a magnitude proportional to said second DC voltage and forming a second negative feedback circuit by being connected to said second capacitor through a load only while the movable contact of said second changeover switch contacts with the other one of said fixed contacts.

References Cited

UNITED STATES PATENTS

| | | | |
|---|---|---|---|
| 2,449,077 | 9/1948 | Lindenblad | 321—49 XR |
| 2,781,490 | 2/1957 | Mitchell et al. | |
| 3,199,014 | 8/1965 | Putzrath | 320—1 |
| 3,371,232 | 2/1968 | Hannan et al. | 320—1 XR |
| 3,435,317 | 3/1969 | Osborn | 320—1 |

WILLIAM M. SHOOP, JR., Primary Examiner

U.S. Cl. X.R.

320—1